US009678775B1

(12) United States Patent
Grover et al.

(10) Patent No.: US 9,678,775 B1
(45) Date of Patent: Jun. 13, 2017

(54) ALLOCATING MEMORY FOR LOCAL VARIABLES OF A MULTI-THREADED PROGRAM FOR EXECUTION IN A SINGLE-THREADED ENVIRONMENT

(75) Inventors: Vinod Grover, Mercer Island, WA (US); John A. Stratton, Champaign, IL (US)

(73) Assignee: NVIDIA Corporation, Santa Clara, CA (US)

( * ) Notice: Subject to any disclaimer, the term of this patent is extended or adjusted under 35 U.S.C. 154(b) by 2179 days.

(21) Appl. No.: 12/393,763

(22) Filed: Feb. 26, 2009

Related U.S. Application Data

(60) Provisional application No. 61/043,708, filed on Apr. 9, 2008.

(51) Int. Cl.
| | |
|---|---|
| G06F 9/455 | (2006.01) |
| G06F 9/48 | (2006.01) |
| G06F 11/26 | (2006.01) |
| G06F 12/02 | (2006.01) |

(52) U.S. Cl.
CPC ........ *G06F 9/45537* (2013.01); *G06F 9/4843* (2013.01); *G06F 11/261* (2013.01); *G06F 12/0253* (2013.01)

(58) Field of Classification Search
CPC ...................................................... G06F 9/455
USPC ............................................................ 717/151
See application file for complete search history.

(56) References Cited

U.S. PATENT DOCUMENTS

| | | | |
|---|---|---|---|
| 5,048,018 A | | 9/1991 | Bernstein et al. |
| 5,161,216 A | | 11/1992 | Peps et al. |
| 5,488,713 A | | 1/1996 | Norton et al. |
| 5,860,009 A | | 1/1999 | Uchihira et al. |
| 5,867,649 A | * | 2/1999 | Larson .......................... 709/201 |
| 5,903,899 A | * | 5/1999 | Steele, Jr. |
| 5,953,530 A | * | 9/1999 | Rishi et al. .................... 717/127 |
| 6,205,414 B1 | * | 3/2001 | Forsman et al. ................ 703/26 |
| 6,275,980 B1 | | 8/2001 | Uchihira et al. |
| 6,292,822 B1 | | 9/2001 | Hardwick |

(Continued)

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Notice of Preliminary Rejection, KR Application No. 10-2009-31038, dated Oct. 25, 2011.

(Continued)

*Primary Examiner* — Wei Zhen
*Assistant Examiner* — Mohammed Huda
(74) *Attorney, Agent, or Firm* — Artegis Law Group, LLP

(57) ABSTRACT

Computer code written to execute on a multi-threaded computing environment is transformed into code designed to execute on a single-threaded computing environment and simulate concurrent executing threads. Optimization techniques during the transformation process are utilized to identify local variables for scalar expansion. A first set of local variables is defined that includes those local variables in the code identified as "Downward exposed Defined" (DD). A second set of local variables is defined that includes those local variables in the code identified as "Upward exposed Use" (UU). The intersection of the first set and the second set identifies local variables for scalar expansion.

20 Claims, 4 Drawing Sheets

(56) References Cited

U.S. PATENT DOCUMENTS

| | | | |
|---|---|---|---|
| 6,598,222 | B2 | 7/2003 | Uchihira et al. |
| 6,748,353 | B1 | 6/2004 | Iliff |
| 6,961,925 | B2 | 11/2005 | Callahan, II et al. |
| 7,058,945 | B2 | 6/2006 | Ichinose et al. |
| 7,454,341 | B1 | 11/2008 | Pan et al. |
| 7,493,606 | B2 | 2/2009 | Morin |
| 7,788,672 | B2 | 8/2010 | Tanaka |
| 7,814,486 | B2 * | 10/2010 | Papakipos et al. ........... 718/100 |
| 7,865,883 | B1 | 1/2011 | Sistare et al. |
| 8,051,412 | B2 | 11/2011 | Kasahara et al. |
| 2004/0205739 | A1 | 10/2004 | Haber et al. |
| 2005/0010911 | A1 | 1/2005 | Kim et al. |
| 2005/0022173 | A1 | 1/2005 | Kanade |
| 2005/0149904 | A1 | 7/2005 | Ball et al. |
| 2005/0273772 | A1 | 12/2005 | Matsakis et al. |
| 2006/0031814 | A1 | 2/2006 | Morin |
| 2007/0038987 | A1 | 2/2007 | Ohara et al. |
| 2007/0219771 | A1 * | 9/2007 | Verheyen et al. .............. 703/15 |
| 2007/0283337 | A1 | 12/2007 | Kasahara et al. |
| 2008/0114937 | A1 | 5/2008 | Reid et al. |
| 2008/0163184 | A1 | 7/2008 | Kanade |
| 2008/0244592 | A1 | 10/2008 | Uchihira |
| 2009/0077360 | A1 | 3/2009 | Liu et al. |

OTHER PUBLICATIONS

Eli Tilevich, et al. "J-Orchestra: Automatic Java Application Partitioning," Proc. of the 16th European Conference Ojbect Oriented Programming (ECOOP 2002), pp. 178-204, Jun. 10-14, 2002.

D.Y. Hwang, et al., "Transform Nested Loops into MultiThread in Java Programming Language for Parallel Processing," KIPS Journal, vol. 5, No. 8, pp. 1997-2012, 1998.

Notice of Preliminary Rejection, KR Application No. 10-2009-31039, dated Oct. 25, 2011.

Moss, et al. "Toward Acceleration of RSA Using 3D Graphics Hardware," LNCS 4887, Dec. 2007, pp. 369-388.

Combined Search and Examination Report, GB App. No. 0905719.1, Jul. 17, 2009.

Office Action, U.S. Appl. No. 12/408,559, dated Feb. 1, 2012.

Chinese Office Action, Serial No. 2009-088972 dated Dec. 12, 2011.

"Posix Cell API," Symposium on Advanced Computing Systems and Infrastructures, IPSJ Symposium Series vol. 2007, No. 5, dated May 23, 2007, pp. 162-163 (4 pages total).

Ohshima, et al., "Message Passing GPGPU Programming," IPSJ SIG Technical Reports, ISSN 0919-6072 vol. No. 19, 2008 pp. 109-114.

Final Office Action, U.S. Appl. No. 12/415,075, dated Jan. 7, 2013.

Nickolls, et al., "Scalable Parallel Programming with CUDA," Mar./Apr. 2008 ACM Queue vol. 6, Issue 2, p. 40-53.

Lee, et al., "Cetus—An Extensible Compiler Infrastructure for Source-toSource Transformation," 16th Annual Workshop on Languages and Compilers for Parallel Computing (LCPC' 2003), 2003. (15 pages).

Stratton, et al., "MCUDA: An Efficient Implementation of CUDA Kernels on Multi-cores," Impact Technical Report 08-01, University of Illinois at Urbana-Champaign, Feb. 2008. (19 pages).

Non Final Office Action, U.S. Appl. No. 12/415,075, dated Jun. 7, 2012.

Non Final Office Action, U.S. Appl. No. 12/415,090, dated Jun. 11, 2012.

Non Final Office Action, U.S. Appl. No. 12/415,118, dated Jun. 21, 2012.

Non Final Office Action, U.S. Appl. No. 12/407,711, dated Mar. 28, 2012.

* cited by examiner

ALLOCATING MEMORY FOR LOCAL VARIABLES OF A MULTI-THREADED PROGRAM FOR EXECUTION IN A SINGLE-THREADED ENVIRONMENT

CROSS REFERENCE TO RELATED APPLICATIONS

The present application claims the benefit and priority of U.S. Provisional Patent Application Ser. No. 61/043,708, filed on Apr. 9, 2008, and titled "System For Executing GPU-Accelerated Code On Multi-Core Architectures." The subject material of this related application is hereby incorporated herein by reference.

BACKGROUND OF THE INVENTION

Field of the Invention

The present invention relates generally to compiler programs and more specifically optimization techniques during compilation of a program written for execution by a multi-threaded processor to be executed by a general purpose single-threaded processor.

Description of the Related Art

Modern graphics processing systems typically include a multi-core graphics processing unit (GPU) configured to execute applications in a multi-threaded manner. For example, NVIDIA's GeForce® 8 GPU has 128 processing cores, with each core having its own floating point unit (FPU) and a set of 1024 registers. Each cluster of 8 processing cores also has 16 KB of shared memory supporting parallel data access. Such an architecture is able to support up to 12,288 concurrent threads, with each thread having its own stack, registers (i.e., a subset of the 1024 registers in a processing core), program counter and local memory.

With such an architecture, multiple instances of a single program (or portions of a program) can be executed in parallel, with each instance having been allocated a thread on a cluster of processing cores such that the threads can simultaneously operate on the same data in shared local memory. NVIDIA's CUDA™ (Compute Unified Device Architecture) software platform provides a C programming language environment that enables developers to write programs that leverage the parallel processing capabilities of GPUs such as the GeForce 8.

Local variables of a CUDA program executing simultaneously on multiple threads of a thread block are handled within each thread's own stack, registers, and local memory while global variables of the program utilize the memory shared across the processing cores of a cluster. To avoid data races, where the simultaneously executing threads of the program block manipulate the same global variables in shared memory, developers writing programs with CUDA explicitly insert synchronization barrier instructions (using the _synchthreads ( ) API) throughout their code to partition the code into sections to enforce an ordering constraint on shared memory operations across the simultaneously executing threads. In particular, a CUDA compiler ensures that all shared memory references occurring prior to a synchronization barrier instruction are completed before any shared memory references after the synchronization barrier.

The execution of concurrent threads of a thread-block by a GPU can be simulated on conventional single-threaded general purpose central processing units (CPUs) by compiling or otherwise transforming a pre-existing CUDA program into a single sequence of instructions that can be sequentially executed by a single thread. Importantly, the single sequence of instructions simulates the simultaneous execution of instructions by concurrent threads of a thread-block. However such a transformation must address several memory access and parallel processing challenges. For example and in particular, to avoid data corruption issues, local variables for each concurrent thread of a thread-block (which would have had their own local memory locations in a thread running in a GPU environment) may need to be allocated their own memory locations within the framework of a single-threaded system.

As the foregoing illustrates, what is needed in the art is a method for efficiently allocating memory for local variables in a program intended to be executed in a multi-threaded environment to enable that program to be executed in a single-threaded environment.

SUMMARY OF THE INVENTION

One or more embodiments of the present invention provide methods for allocating memory locations for local variables in a code segment intended for execution in a multi-threaded computing environment in order to simulate the multi-threaded execution in a single-threaded computing environment. Such methods may be incorporated into compiler techniques to enable a programmer to write code for execution on multi-core GPUs (e.g., using CUDA libraries and extensions to the C programming language to develop programs that leverage the parallel processing power of a GeForce 8 GPU) that can then be compiled into an executable that can run in on general purpose single-threaded CPU system that has no hardware to support parallel processing capabilities.

A method for allocating memory locations for such local variables, according to an embodiment of the present invention, includes the steps of identifying a first set of local variables that are referenced in expressions of instructions of the code segment, identifying a second set of local variables that are assigned expressions in instructions of the code segment, determining an intersection of the first set of local variables and the second set of local variables; and allocating a plurality of memory locations for each local variable in the intersection, wherein the plurality of memory locations corresponds to a plurality of threads, a concurrent execution of the plurality of threads being simulated in the single-threaded computing environment.

One advantage of the disclosed method is that a programmer does not need to modify a program written to operate in a multi-threaded system (e.g., utilizing specific multi-threaded language extensions and library functions, etc.) to enable the program to be run in a single-threaded system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
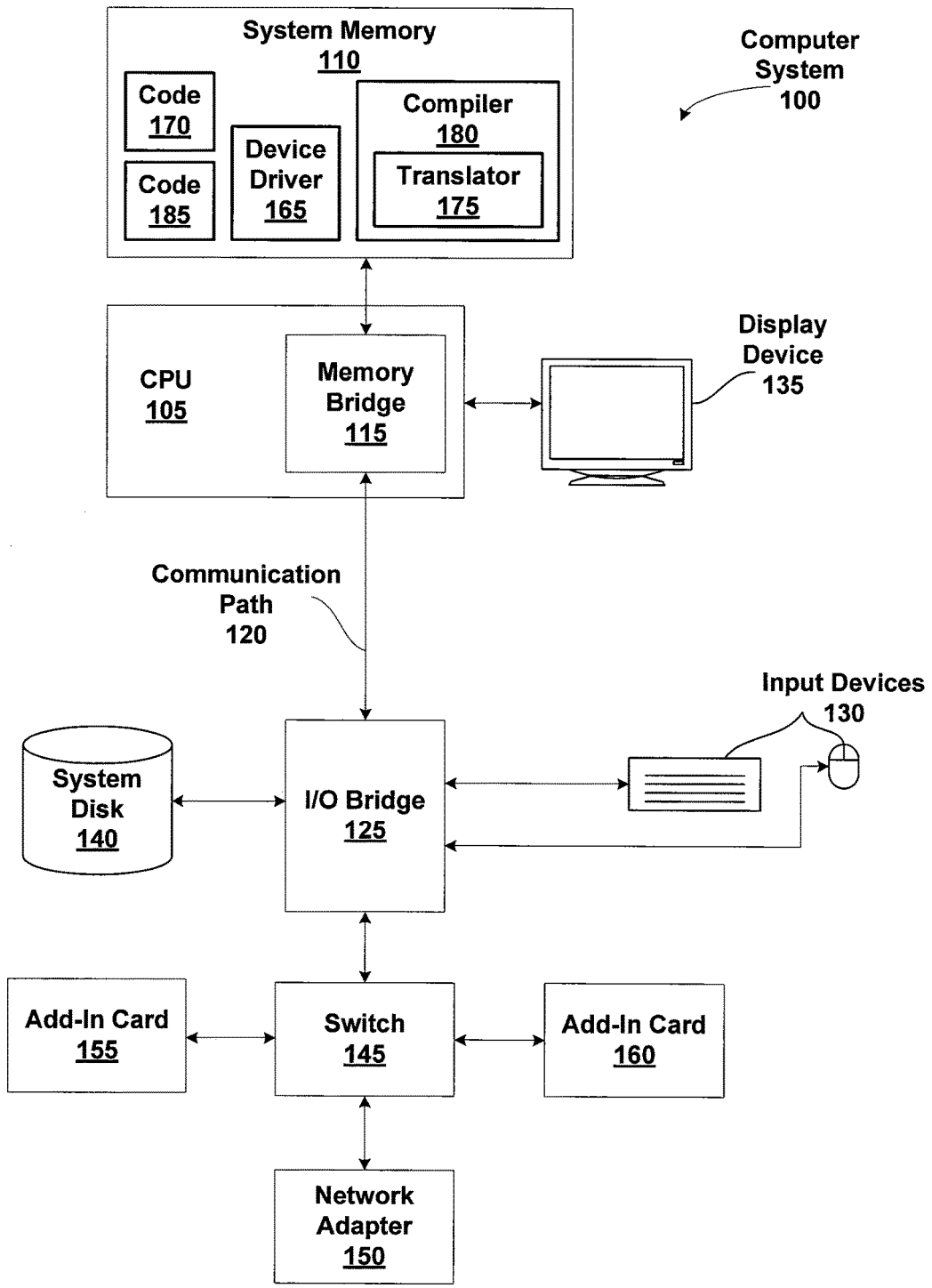
FIG. 1 is a block diagram illustrating a single-threaded computer system configured to implement on or more aspects of the present invention.

FIG. 1 is a block diagram illustrating a single-threaded computer system 100, in which an embodiment of the present invention may be utilized. Computer system 100 includes a single-threaded CPU 105 and a system memory 110 communicating via a bus path that includes a memory bridge 115. Memory bridge 115, which may be, for example, a northbridge chip, is connected via a bus or other communication path 120 (e.g., a HyperTransport link) to an I/O (input/output) bridge 125. I/O bridge 125, which may be, for example, a southbridge chip, receives user input from one or more user input devices 130 (e.g., keyboard, mouse, etc.) and forwards the input to CPU 105 via communication path 120 and memory bridge 115. CPU 105 produces output for display on display device 135 (e.g., a conventional CRT or LCD based monitor). A system disk 140 is also connected to I/O bridge 125. A switch 145 provides connections between I/O bridge 125 and other components such as a network adapter 150 and various add-in cards 155 and 160. Other components (not shown), including USB or other port connections, CD drives, DVD drives, film recording devices, and the like, may also be connected to I/O bridge 125. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

CPU 105 operates as the control processor of computer system 100, managing and coordinating the operation of other system components and system memory 110 includes an execution image of an operating system, a device driver 165, and CUDA code 170 that contains programming instructions intended for execution by a multi-threaded parallel processing computer system (e.g., one that contains a multi-threaded processing subsystem such as a GPU). In the context of the present description, code refers to any source code, human readable programming language code, or other computer code, instructions, and/or functions that may be executed or compiled for execution on a processor. For example, in various embodiments, the code may be C code, C++ code, etc. In one embodiment, the code 170 may include a language extension or library for a computer language (e.g., an extension or library for C, C++, etc.), for example, to support specialized functions, such as parallel processing on a GPU.

CUDA code 170 is not adapted for execution by a single-threaded CPU such as CPU 105. Because CUDA code 170 is instead adapted for execution by a multi-threaded computing environment, CUDA code 170 is transformed using translator component 175 of a compiler 180 to produce transformed code 185 that contains a set of instructions that are intended to be executed sequentially in a single-thread to simulate the execution of multiple threads in a multi-threaded system. In one embodiment, transformed code 185 is represented in the same programming language used in CUDA code 170 (e.g., C or C++, etc.) but does not utilize any special functions provided by special parallel processing and/or GPU language extensions or libraries. In order for CPU 105 to run the program represented by CUDA code 170, CUDA code 170 must first be transformed into code 185. The transformed code 185 may then be subsequently compiled by compiler 180 into object code for execution by CPU 105. Compiler 180 may perform optimizations that are specific to CPU 105. It should be recognized that alternative embodiments may utilize a translator that functions separately from the compiler 180 but whose function is similar to translator component 175. In other embodiments, compiler 180 may be included within device driver 165 that is configured to interface between code 170, code 185 and CPU 105.

When a compiler transforms CUDA code into a single sequence of instructions for execution on a single-threaded CPU, the compiler ensures that the code for each synchronization barrier partition (e.g., segments of the CUDA code that are separated by _synchthreads ( ) instructions) is executed for each simulated concurrent thread before any code in the next synchronization barrier partition is executed by any of the simulated concurrent threads. Table 1 below illustrates a simple example:

TABLE 1

Transformation of Synchronization
Barrier Partitions into Vector Loops

```
CUDA Code:
  _global_ void function( ){
    SharedMem[threadIdX.x] = ...; // store value into shared memory
    _synchthreads( );
    =...(SharedMem[threadIdX.x] + SharedMem[threadIdX.x-1])/2.0;
  }
Transformed into single sequence of instructions for single thread:
  void function( ){
    for (int tid_x = 0; tid_x < dimblock.X; tid_x++) {
      SharedMem[tid_x] = ...; //store value into shared memory
    }
    for (int tid_x = 0; tid_x < dimblock.X; tid_x++) {
      = ...(SharedMem[tid_x] + SharedMem[tid_x - 1])/2.0;
    }
```

As shown in Table 1, during transformation, the instructions in each of the two synchronization barrier partitions (each partition consisting of one instruction, above and below the _synchthreads ( ) instruction, respectively) are wrapped with a for loop (also referred to herein as a "vector loop") that iterates through the number of threads that would have been concurrently executing in a multi-threaded execution environment (i.e., "tid" in "tid_x" of the transformed code in Table 1 stands for "thread ID"). Separately wrapping the code in each synchronization barrier partition with a vector loop simulates the data integrity preservation performed by a _synchthreads ( ) instruction in a multi-threaded environment by ensuring that a single-threaded environment will iterate through all the concurrent threads and complete memory operations within the partition before moving to the next vector loop for the next partition.

Certain local variables within a synchronization barrier partition of CUDA code are specially handled during a compiler's transformation of CUDA code into a single sequence of instructions for execution on a single-threaded CPU. In a multi-threaded environment of a GPU, each concurrently executing thread provides local variables their own memory locations in the thread's own local memory. As such, local variables of one thread do not conflict with the same local variables of another thread. However, in a single-threaded context, the declaration of a local variable in code allocates only a single memory location for the local variable. Use of such a single local variable to simulate concurrently executing threads in a single sequence of instructions may cause data corruption issues across the threads, since each simulated thread would access the same memory location when accessing the local variable. Table 2 below illustrates the use of a "scalar expansion" technique to address the transformation of local variables:

TABLE 2

Scalar Expansion of Local Variables

```
CUDA Code:
  _global_ void function( ) {
    int leftIndex, rightIndex;
    SharedMem[threadIdX.x] = ...; // store value into shared memory
    leftIndex = ...threadId.x...;
    rightIndex = ...threadId.x;
    _synchthreads( );
    = ...(SharedMem[leftIndex] + SharedMem[rightIndex])/2.0;
  }
Transformed into single sequence of instructions for single thread:
  void function ( ) {
    ...
    for (int tid_x = 0; tid_x < dimblock.X; tid_x++) {
      SharedMem[tid.x] = ...; // store value into shared memory
      leftIndexArray[tid_x] = ...threadId.x...;
      rightIndexArray[tid_x] = ...threadId.x;
    }
    for (int tid_x = 0; tid_x < dimblock.X; tid_x++) {
      = ...(SharedMem[leftIndeXArray[tid_x]] +
        SharedMem[rightIndexArray[tid_x]])/2.0;
    }
  }
```

Table 2 illustrates the transformation of CUDA code into a single sequence of instructions for execution on a single-threaded CPU using (i) vector loops to preserve the synchronization barriers required by the _synchthreads ( ) instruction (as previously discussed), and (ii) "scalar expansion" to avoid data corruption issues with local variables. The first synchronization barrier partition of the CUDA code in Table 2 contains declarations for and utilization of two local variables, namely leftIndex and rightIndex. These local variables are then subsequently accessed in the second barrier partition of the CUDA code.

In a multi-threaded environment of a GPU, each concurrently executing thread would allocate a memory location for leftIndex and rightIndex in its own local memory so that use of such local variables does not conflict with use of leftIndex and rightIndex in other currently executing threads (i.e., which also allocate their own separate local memory locations for these local variables). In order to maintain use of separate memory locations for local variables for each simulated concurrently executing thread in a single-threaded environment, the transformation in Table 2 "promotes" each declared local variable leftIndex and rightIndex into an array of memory locations, namely leftIndexArray [ ] and rightIndexArray [ ], respectively, where the size of each array is the number of simulated concurrently executing threads. Each index in the array thus corresponds to a local variable memory location for a particular concurrent thread. This promotion of local variables in CUDA code into an array of local variables to accommodate the simulation of concurrently executing threads in a single executed sequence of instructions is referred to herein as "scalar expansion."

As can be readily ascertained from Table 2, if leftIndex and right Index are not promoted to leftIndexArray [ ] and rightIndexArray H through scalar expansion, access to a single leftIndex and rightIndex variable in the second vector loop of Table 2 would result in the incorrect storage of values for leftIndex and rightIndex across different simulated executing threads. Namely, no matter what iteration of the second vector loop (i.e., relating to a particular thread ID), leftIndex and rightIndex would always contain values corresponding to the last iteration (relating to the last thread ID) of the vector loop in the first synchronization barrier partition.

Scalar expansion of local variables as described herein can result in the consumption of significant memory during execution of a transformed CUDA program on a single-threaded CPU since such scalar expanded local variables require the allocation of a memory arrays to simulate the concurrent execution of threads. It should be recognized, however, that not all local variables occurring within a particular synchronization barrier partition requires scalar expansion. Table 3 illustrates an example of a local variable that does not require scalar expansion:

TABLE 3

Local Variable Not Requiring Scalar Expansion (middleIndex)

```
CUDA Code:
  _global_ void function( ) {
    int leftIndex, middleIndex; rightIndex;
    SharedMem[threadIdX.x] = ...; // store value into shared memory
    leftIndex = ...threadId.x...;
    middleIndex = ...threadId.x...;
    rightIndex = ...threadId.x + middleIndex...;
    _synchthreads( );
    = ...(SharedMem[leftIndex] + SharedMem[rightIndex])/2.0;
  }
Transformed into single sequence of instructions for single thread:
  void function( ) {
    ...
    for (int tid_x = 0; tid_x < dimblock.X; tid_x++) {
      SharedMem[tid.x] = ...; // store value into shared memory
      leftIndexArray[tid_x] = ...threadId.x...;
      middleIndex = ...threadId.x...;
      rightIndexArray[tid_x] = ...threadId.x + middleIndex...;
    }
    for (int tid_x = 0; tid_x < dimblock.X; tid_x++) {
      = ...(SharedMem[leftIndexArray[tid_x]] +
        SharedMem[rightIndexArray[tid_x]])/2.0;
    }
  }
```

Table 3 is similar to Table 2, except that a new local variable, middleIndex, is introduced by the programmer for an additional calculation and utilized in the first synchronization barrier partition. However, because middleIndex is not utilized in the second synchronization barrier partition or any subsequent iteration of the first synchronization barrier, middle Index does not need to be scalar expanded because its uses are solely confined within a single iteration of the first vector loop.

The disclosure herein describes techniques to identify a minimal set of local variables within a synchronization barrier partition that need to be scalar expanded. Such techniques reduce the amount of memory needed to transform a CUDA program and also yield savings in access times for local variables in the transformed code. Without loss of generality, embodiments described below assume that the statement constructs of Table 4 below make up a portion of the grammar of a theoretical programming language used by developers to write a multi-threaded application for a GPU. It should be recognized that Table 4 depicts a simplified version of the statements in a grammar for illustrative purposes only and that a true grammar utilized in other embodiments of the present invention would describe the C language, including additional support for any CUDA language extensions. For exemplary purposes only, the instructions in a particular barrier synchronization partition can be represented as a sequence of the statement constructs of Table 4 below:

TABLE 4

Statement Constructs

| Statement Construct | Grammar |
|---|---|
| <statement> | <assignment statement> \| <statement list> \| <if statement> \| <while-do statement> \| <do-while statement> \| <do statement> |
| <assignment statement> | <var> = <expr>; |
| <statement list> | {<statement> \| <statement> <statement list>} |
| <if statement> | IF (<expr>) THEN <statement> ELSE <statement> |
| <while-do statement> | WHILE (<expr>) <statement>; |
| <do-while statement> | DO <statement> WHILE (<expr>); |
| <do statement> | DO (<statement>, <expr>, <statement>) <statement> |
| <var> | a valid variable in the grammar |
| <expr> | a valid expression in the grammar |

As used in both Table 4, <var> represents a variable and <expr> represents an expression of the programming language used in an embodiment of the present invention (e.g., C, C++, etc.). Such an expression is a combination of values, variables, operators and functions that are interpreted or evaluated in accordance with the rules of the programming language to provide a return value which may be assigned to a variable, for example, by an <assignment statement>.

Figure 2A:
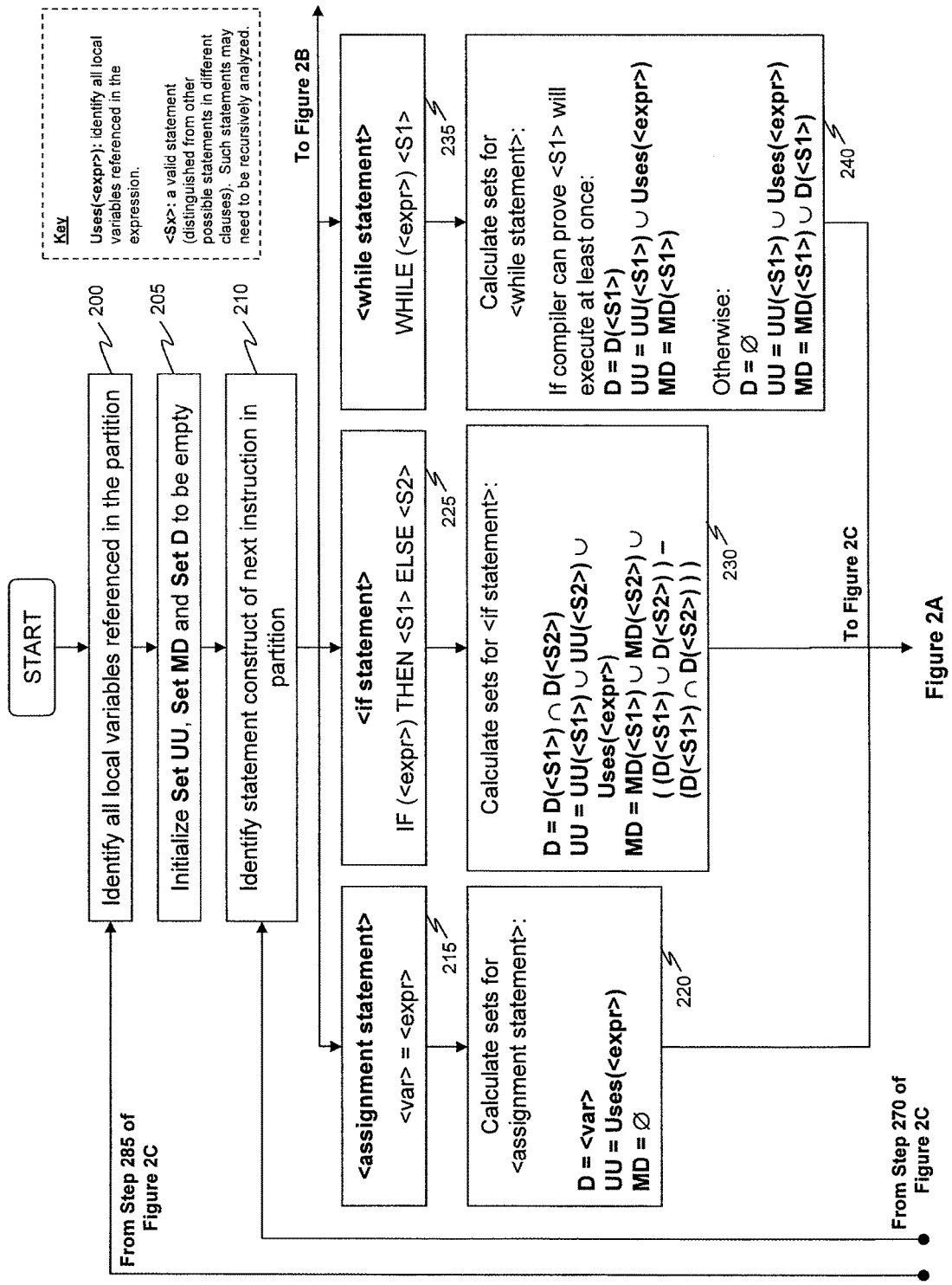
FIGS. 2A-2C set forth a flow diagram for identifying local variables in instructions of a synchronization barrier partition for scalar expansion, according to one embodiment of the present invention.
Figure 2B:
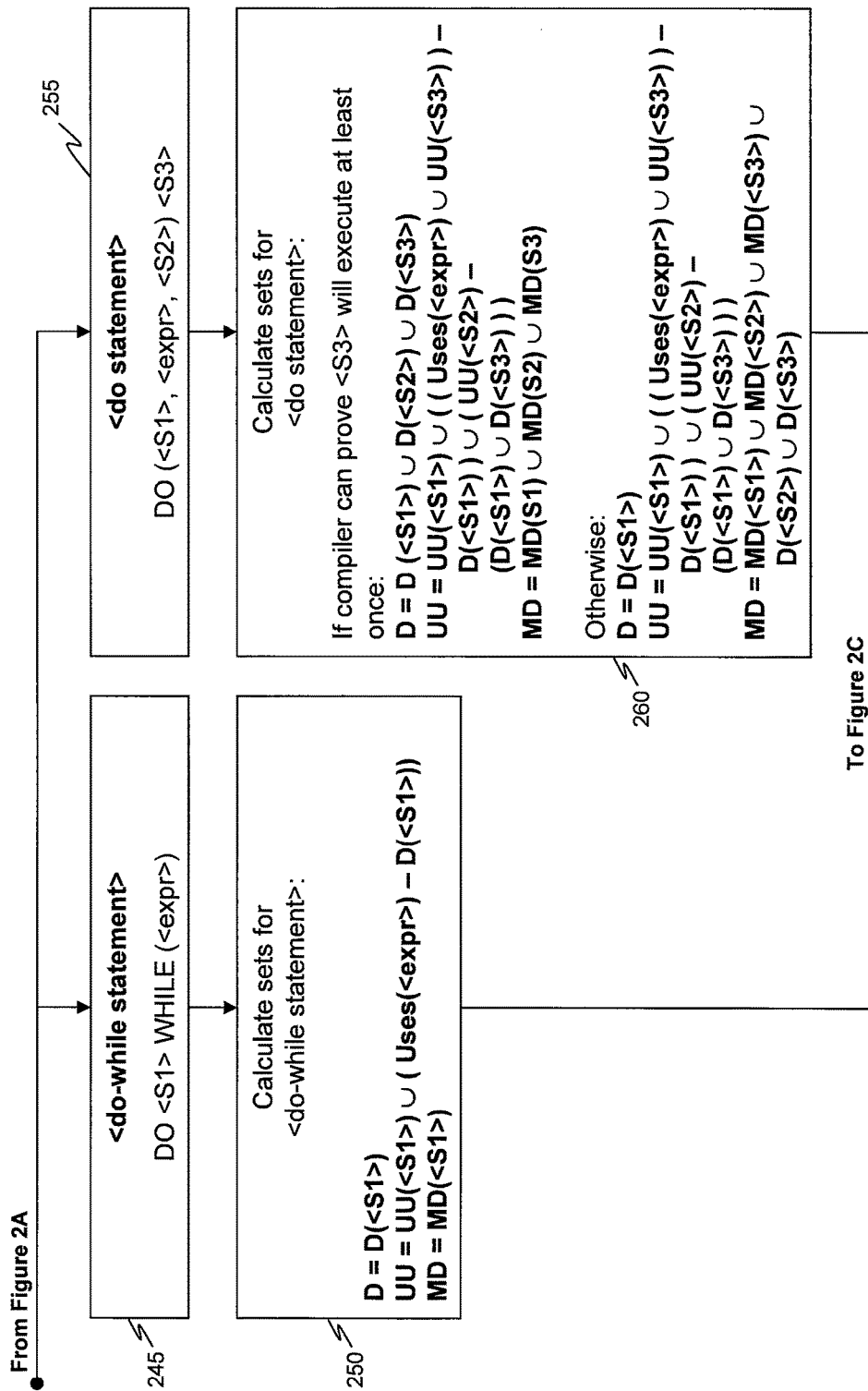
Figure 2C:
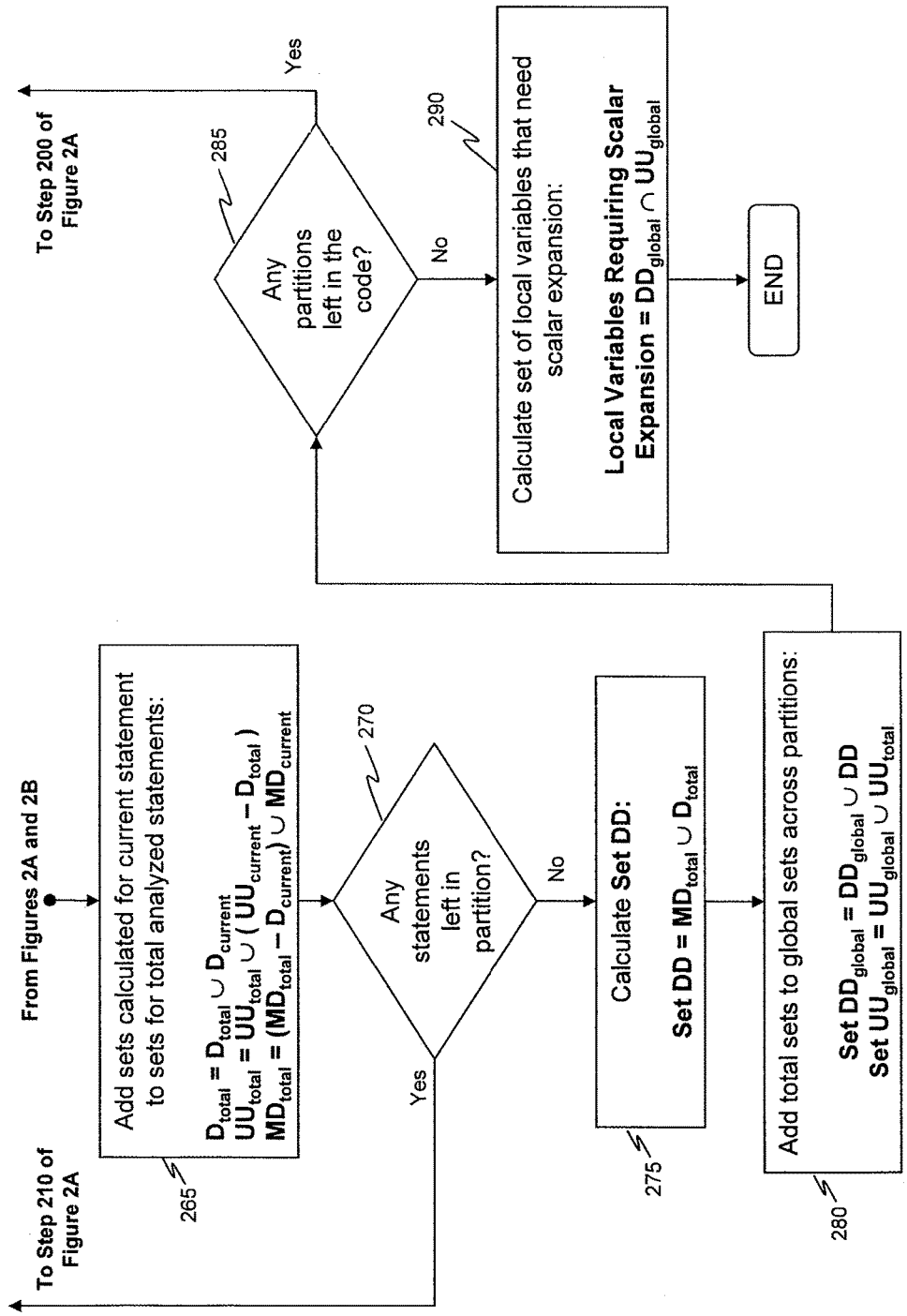

FIGS. 2A-2C set forth a flow diagram for identifying local variables in instructions of a synchronization barrier partition for scalar expansion, according to one embodiment of the present invention. As shown, a compiler tasked with transforming a CUDA program into a sequence of instructions for execution in a single-threaded computing system begins in step 200 by identifying all local variables that appear in the synchronization barrier partition. In step 205, the compiler initializes three working sets of local variables to be empty: (1) Set "MD", (2) Set "D", and Set "UU." Given a particular statement in a partition, Set UU represents those local variables in the partition that have been referenced in expressions of the statement itself or prior statements in the partition (i.e., "Upward exposed Use"), Set D represents those local variables in the partition that have been assigned some sort of value or expression in the statement itself or prior statements (i.e., "Defined"), and Set MD represents those local variables in the partition that may be assigned some sort of value or expression in the statement itself or prior statements (i.e., "May be Defined") during execution of the partition code. For example, a local variable that is assigned a value in the ELSE clause of an <if statement> may be placed in set MD because depending on the value of the conditional <expr> of the IF clause, the ELSE clause may or may not be executed.

In step 210, the compiler begins to sequentially examine the instructions in the partition and match such instructions to their corresponding statement construct in Table 4. If the instruction is an <assignment statement> in 215, the compiler calculates temporary sets relating to UU, MD and D for the <assignment statement> itself in accordance with the rules articulated in step 220. If the instruction is an <if statement> in 225, the compiler calculates temporary sets relating to UU, MD and D for the <if statement> itself in accordance with the rules articulated in step 230. If the instruction is a <while statement> in 235, the compiler calculates temporary sets relating to UU, MD and D for the <while statement> itself in accordance with the rules articulated in step 240. If the instruction is a <do-while statement> in 245, the compiler calculates temporary sets relating to UU, MD and D for the <do-while statement> itself in accordance with the rules articulated in step 250. If the instruction is a <do statement> in 255, the compiler calculates temporary sets relating to UU, MD and D for the <do statement> itself in accordance with the rules articulated in step 260.

The compiler then adds the temporary sets relating to UU, MD and D for the current statement according to the rules of step 265 to Sets UU, MD and D, which contain the appropriate local variables for all statements in the partition analyzed thus far. In step 270, if there are more statements in the partition to analyze, the compiler returns to step 210 to analyze the next statement. If, however, there are no more statements in the partition, a new Set DD (i.e., "Downward exposed Defined"), representing those local variables that have been assigned some value or expression in the partition or may be assigned some value or expression in the partition (i.e., the union of Set MD and D) is created in step 275. In step 280, Set DD and Set UU are added to corresponding global sets for DD and UU that contain local variables analyzed in prior partitions. In step 285, if there are more partitions to analyze, the compiler returns to step 200. If all partitions have been analyzed, in step 290, the compiler takes the intersection of the global sets for DD and UU, resulting in a set of local variables that need to be scalar expanded. It should be recognized that in certain embodiments, the statements analyzed in 215, 225, 235, 245 and 255 may contain sub-statements in certain of its clauses (i.e., statements such as <S1>, <S2> or <S3> in FIG. 2 that may appear in the foregoing statements) that need to be recursively analyzed through the flow of FIG. 2 prior to reaching step 265. Such recursive analysis of statements may utilize compilation parsing techniques known to those with ordinary skill in the art. It should also be recognized that alternative rules other than those set forth in steps 220, 230, 240, 250 and 260 may be utilized without departing fro the spirit of the invention. For example, rather than calculating Set DD at the end of the partition in step 275, Set DD may be calculated at each iteration.

While the foregoing is directed to embodiments of the present invention, other and further embodiments of the invention may be devised without departing from the basic scope thereof. For example, the descriptions herein depict the transformation of CUDA code, written in the C language, into a sequence of instructions that are also expressed in the C language. However, it should be recognized that any level of code generated during the compilation process may be transformed using the techniques described herein, including any intermediary forms of code, assembly code and the like. Similarly, it should further be recognized that any other computer programming language such as C++, Java, other object-oriented languages, other procedural language and any other languages, and any extensions to such languages to provide multi-threading support on parallel processors other than CUDA may be utilized in alternative embodiments. It should further be recognized that the foregoing descriptions of the code transformation process utilize simplified versions of grammars, constructs and other compiler-based concepts and that known compilation techniques such as lexical analysis, syntactical analysis and abstract syntax tree (AST) generation may be utilized in conjunction with the techniques described herein to generate the transformed code and any subsequent executable object code.

In addition, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for allocating memory locations for local variables in a code segment intended for execution in a multi-threaded computing environment in order to simulate the multi-threaded execution in a single-threaded computing environment, the method comprising:
   identifying a first set of local variables that are referenced in expressions of instructions of the code segment, wherein, for each particular instruction in the code segment, the first set comprises local variables that are referenced in the particular instruction or referenced in expressions in at least one instruction of the code segment prior to the particular instruction;
   identifying a second set of local variables that are assigned expressions in instructions of the code segment, wherein, for each particular instruction in the code segment, the second set comprises local variables that are assigned expressions in the particular instruction or assigned expressions in at least one instruction of the code segment prior to the particular instruction;
   determining an intersection of the first set of local variables and the second set of local variables; and
   allocating a plurality of memory locations in a memory of the single-threaded computing environment for each local variable in the intersection, wherein each memory location in the plurality of memory locations corresponds to a different thread in a plurality of threads, a concurrent execution of the plurality of threads being simulated in the single-threaded computing environment.

2. The method of claim 1, wherein the steps of identifying the first set of local variables and identifying the second set of local variables comprise iterating over each instruction in the code segment.

3. The method of claim 1, wherein the plurality of memory locations for each local variable is allocated as an array data structure.

4. The method of claim 1, wherein the steps of identifying the first set of local variables and identifying the second set of local variables comprise respectively determining a subset of the first set of local variables and a subset of the second set of local variables for each of a plurality of synchronization barrier partitions in the code segment.

5. The method of claim 4, further comprising the step of wrapping a vector loop around the instructions included within each of the synchronization barrier partitions, wherein each of the plurality of threads executes the vector loop.

6. The method of claim 1, further comprising the step of matching each of the instructions of the code segment to one of a plurality of statement constructs relating to a programming language grammar of the code segment.

7. The method of claim 6, wherein each of the plurality of statement constructs corresponds to a set of rules for identifying a subset of the local variables for the first set of local variables and a subset of the local variables of the second set of local variables in a matched instruction.

8. A non-transitory computer-readable medium that includes instructions that, when executed by a processing unit, causes the processing unit to allocate memory locations for local variables in a code segment intended for execution in a multi-threaded computing environment in order to simulate the multi-threaded execution in a single-threaded computing environment, by performing the steps of:
   identifying a first set of local variables that are referenced in expressions of instructions of the code segment, wherein, for each particular instruction in the code segment, the first set comprises local variables that are referenced in the particular instruction or referenced in expressions in at least one instruction of the code segment prior to the particular instruction;
   identifying a second set of local variables that are assigned expressions in instructions of the code segment, wherein, for each particular instruction in the code segment, the second set comprises local variables that are assigned expressions in the particular instruction or assigned expressions in at least one instruction of the code segment prior to the particular instruction;
   determining an intersection of the first set of local variables and the second set of local variables; and
   allocating a plurality of memory locations in a memory of the single-threaded computing environment for each local variable in the intersection, wherein each memory location in the plurality of memory locations corresponds to a different thread in a plurality of threads, a concurrent execution of the plurality of threads being simulated in the single-threaded computing environment.

9. The computer-readable medium of claim 8, wherein the steps of identifying the first set of local variables and the second set of local variables comprise iterating over each instruction in the code segment.

10. The computer-readable medium of claim 8, wherein the plurality of memory locations for each local variable is allocated as an array data structure.

11. The computer-readable medium of claim 8, wherein the steps of identifying the first set of local variables and identifying the second set of local variables comprise respectively determining a subset of the first set of local variables and a subset of the second set of local variables for each of a plurality of synchronization barrier partitions of the code segment.

12. The computer-readable medium of claim 11, wherein the processing unit further performs the step of wrapping a vector loop around the instructions included within each of the synchronization barrier partitions, wherein each of the plurality of threads executes the vector loop.

13. The computer-readable medium of claim 8, wherein the processing unit further performs the step of matching each of the instructions of the code segment to one of a plurality of statement constructs relating to a programming language grammar of the code segment.

14. The computer readable medium of claim 13, each of the plurality of statement constructs corresponds to a set of rules for identifying a subset of the local variables for the first set of local variables and a subset of the local variables of the second set of local variables in a matched instruction.

15. A computing system configured to allocate memory locations for local variables in a code segment intended for execution in a multi-threaded computing environment in order to simulate the multi-threaded execution in a single-threaded computing environment, the computer system comprising:
   a system memory configured to store the code segment and a compiler; and
   a processor coupled to the system memory, wherein the processor is configured to execute the compiler to perform the steps of:
      (i) identifying a first set of local variables that are referenced in expressions of instructions of the code segment, wherein, for each particular instruction in the code segment, the first set comprises local variables that are referenced in the particular instruction or referenced in expressions in at least one instruction of the code segment prior to the particular instruction,
      (ii) identifying a second set of local variables that are assigned expressions in instructions of the code segment, wherein, for each particular instruction in the code segment, the second set comprises local variables that are assigned expressions in the particular instruction or assigned expressions in at least one instruction of the code segment prior to the particular instruction,
      (iii) determining an intersection of the first set of local variables and the second set of local variables, and
      (iv) allocating a plurality of memory locations in a memory of the single-threaded computing environment for each local variable in the intersection, wherein each memory location in the plurality of memory locations corresponds to a different thread in a plurality of threads, a concurrent execution of the plurality of threads being simulated in the single-threaded computing environment.

16. The computing system of claim 15, wherein the plurality of memory locations for each local variable is allocated as an array data structure.

17. The computing system of claim 15, wherein the steps of identifying the first set of local variables and identifying the second set of local variables comprise respectively determining a subset of the first set of local variables and a subset of the second set of local variables for each of a plurality of synchronization barrier partitions of the code segment.

18. The computing system of claim 17, wherein execution of the compiler further causes the processor to perform the step of wrapping a vector loop around the instructions included within each of the synchronization barrier partitions, wherein each of the plurality of threads executes the vector loop.

19. The computing system of claim 15, wherein execution of the compiler further causes the processor to perform the step of matching each of the instructions of the code segment to one of a plurality of statement constructs relating to a programming language grammar of the code segment.

20. The computing system of claim 19, wherein each of the plurality of statement constructs corresponds to a set of rules for identifying a subset of the local variables for the first set of local variables and a subset of the local variables of the second set of local variables in a matched instruction.

* * * * *